US012800875B2

(12) United States Patent
Wang et al.

(10) Patent No.: US 12,800,875 B2
(45) Date of Patent: Nov. 17, 2026

(54) CAMERA OPTICAL LENS

(71) Applicant: AAC Optics (Suzhou) Co., Ltd., Suzhou (CN)

(72) Inventors: Hongyu Wang, Suzhou (CN); Shunda Zhou, Suzhou (CN)

(73) Assignee: AAG Optics (Suzhou) Co., Ltd., Suzhou (CN)

(*) Notice: Subject to any disclaimer, the term of this patent is extended or adjusted under 35 U.S.C. 154(b) by 255 days.

(21) Appl. No.: 18/641,440

(22) Filed: Apr. 22, 2024

(65) Prior Publication Data

US 2025/0180865 A1 Jun. 5, 2025

(30) Foreign Application Priority Data

Dec. 4, 2023 (CN) ......................... 202311639745.8

(51) Int. Cl.

*G02B 9/34* (2006.01)
*G02B 3/02* (2006.01)
*G02B 13/00* (2006.01)
*G02B 13/18* (2006.01)

(52) U.S. Cl.

CPC ............... *G02B 9/34* (2013.01); *G02B 13/00* (2013.01); *G02B 13/001* (2013.01); *G02B 13/18* (2013.01); *G02B 13/0015* (2013.01)

(58) Field of Classification Search

CPC ........ G02B 9/34; G02B 13/00; G02B 13/001; G02B 13/18; G02B 13/0015; G02B 15/144113; G02B 15/145129; G02B 15/145113

USPC ........ 359/708, 714, 715, 757, 764, 772, 774

See application file for complete search history.

(56) References Cited

U.S. PATENT DOCUMENTS 7,092,172 B2 * 8/2006 Amanai ............... G02B 13/004 359/774
8,358,473 B2 * 1/2013 Tang ...................... G02B 13/22 359/740
2012/0229922 A1 * 9/2012 Kubota .................. G02B 13/18 359/774
2018/0024320 A1 * 1/2018 Asami ...................... G02B 9/34 359/774

* cited by examiner

*Primary Examiner* — Mahidere S Sahle
(74) *Attorney, Agent, or Firm* — Wiersch Law Group

(57) ABSTRACT

The present disclosure relates to the field of optical lens, and discloses a camera optical lens. The camera optical lens includes from an object side to an image side: a first lens having positive refractive power, a second lens having negative refractive power, a third lens having positive refractive power, and a fourth lens having positive refractive power; and following relational expressions are satisfied: $1.50 \leq TTL/f \leq 2.50$; $1.00 \leq f1/f \leq 1.50$; $-12.00 \leq f2/d3 < -4.00$; $n1 \geq 1.70$; and $1.50 \leq d7/d5 \leq 5.00$. The camera optical lens has good optical characteristics and good optical performance, and is particularly suitable for a mobile phone camera lens assembly, a vehicle-mounted lens and a WEB camera lens composed of camera elements such as CCD, CMOS with high resolution.

10 Claims, 12 Drawing Sheets

CAMERA OPTICAL LENS

TECHNICAL FIELD

The present disclosure relates to the field of optical lens and, in particular, to a camera optical lens applied to handheld terminal devices such as smart phones, digital cameras, and camera devices such as monitors, PC lenses, and vehicle-mounted lenses.

BACKGROUND

In recent years, with the rise of various smart devices, the demand for a miniaturized camera optical lens has gradually increased. Since pixel size of the optical sensor is reduced, and the current electronic product has a development trend of light weight, thinness and being portable, the miniaturized camera optical lens with good imaging quality has become a mainstream of the current market. In order to obtain better imaging quality, a multi-lens structure is mostly used. In addition, with the development of technology and the increase of user's diversified requirements, under the condition that the pixel area of the photosensitive device is continuously reduced and the requirements on the imaging quality of the system are continuously improved, a structure with four lenses gradually appears in the lens design. There is an urgent need for a camera optical lens having good optical performance.

SUMMARY

In view of the above problems, an object of the present disclosure is to provide a camera optical lens meeting design requirements of good optical performance.

In order to solve the above technical problem, the present disclosure provides a camera optical lens. The camera optical lens includes: from an object side to an image side, a first lens having positive refractive power, a second lens having negative refractive power, a third lens having positive refractive power, and a fourth lens having positive refractive power. A focal length of the optical camera lens is defined as f, a focal length of the first lens is defined as f1, a focal length of the second lens is defined as f2, an on-axis thickness of the second lens is defined as d3, an on-axis thickness of the third lens is d5, an on-axis thickness of the fourth lens is defined as d7, a total optical length from an object side surface of the first lens to an image plane of the camera optical lens along an optic axis of the camera optical lens is defined as TTL, and a refractive index of the first lens is defined as n1, and following relational expressions are satisfied:

$$1.50 \leq TTL/f \leq 2.50;$$

$$1.00 \leq f1/f \leq 1.50;$$

$$-12.00 \leq f2/d3 < -4.00;$$

$$n1 \geq 1.70; \text{ and}$$

$$1.50 \leq d7/d5 \leq 5.00.$$

As an improvement, a central curvature radius of an object side surface of the third lens is defined as R5, and a central curvature radius of an image side surface of the third lens is defined as R6, and a following relational expression is satisfied:

$$1.00 \leq R5/R6 \leq 5.00.$$

As an improvement, an on-axis distance from an image side surface of the first lens to an object side surface of the second lens is defined as d2, and a following relational expression is satisfied:

$$1.00 \leq d3/d2 \leq 5.00.$$

As an improvement, the object side surface of the first lens is convex in a paraxial region;

an on-axis thickness of the first lens is defined as d1, a central curvature radius of an object side surface of the first lens is defined as R1, a central curvature radius of an image side surface of the first lens is defined as R2, and following relational expressions are satisfied:

$$-3.68 \leq (R1+R2)/(R1-R2) \leq -0.62; \text{ and}$$

$$0.095 \leq d1/TTL \leq 0.150.$$

As an improvement, an object side surface of the second lens is concave in a paraxial region, and an image side surface of the second lens is concave in the paraxial region;

a central curvature radius of the object side surface of the second lens is defined as R3, a central curvature radius of the image side surface of the second lens is defined as R4, and following relational expressions are satisfied:

$$-2.24 \leq f2/f \leq -0.41;$$

$$0.01 \leq (R3+R4)/(R3-R4) \leq 0.66; \text{ and}$$

$$0.034 \leq d3/TTL \leq 0.092.$$

As an improvement, an object side surface of the third lens is concave in a paraxial region, and an image side surface of the third lens is convex in the paraxial region;

a focal length of the third lens is defined as f3, a central curvature radius of an object side surface of the third lens is defined as R5, a central curvature radius of an image side surface of the third lens is defined as R6, and following relational expressions are satisfied:

$$0.77 \leq f3/f \leq 8.67;$$

$$0.75 \leq (R5+R6)/(R5-R6) \leq 120.93; \text{ and}$$

$$0.054 \leq d5/TTL \leq 0.252.$$

As an improvement, an object side surface of the fourth lens is convex in a paraxial region;

a focal length of the fourth lens is defined as f4, a central curvature radius of an object side surface of the fourth lens is defined as R7, a central curvature radius of an image side surface of the fourth lens is defined as R8, and following relational expressions are satisfied:

$$0.45 \leq f4/f \leq 2.63;$$

-continued $$-4.89 \le (R7+R8)/(R7-R8) \le -0.28; \text{ and}$$

$$0.272 \le d7/TTL \le 0.382.$$

As an improvement, the first lens, the second lens, the third lens and the fourth lens are made of glass, respectively.

As an improvement, an F-number FNO of the camera optical lens is smaller than or equal to 2.

As an improvement, an image height of the camera optical lens is defined as IH, and a following relational expression is satisfied:

$$TTL/IH \le 6.93.$$

The present disclosure has following beneficial effects: the camera optical lens as described in the present disclosure has good optical characteristics and good optical performance, and is particularly suitable for a mobile phone camera lens assembly, a vehicle-mounted lens and a WEB camera lens composed of camera elements such as CCD, CMOS with high resolution.

BRIEF DESCRIPTION OF DRAWINGS

Many aspects of the exemplary embodiment can be better understood with reference to following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

In order to more clearly illustrate objectives, technical solutions, and advantages of Embodiments of the present disclosure, the technical solutions in Embodiments of the present disclosure are clearly and completely described in details with reference to the accompanying drawings. The described embodiments are merely part of the embodiments of the present disclosure rather than all of the embodiments. All other embodiments obtained by those skilled in the art based on the embodiments of the present disclosure shall fall into the protection scope of the present disclosure.

Embodiment 1

Figure 1:
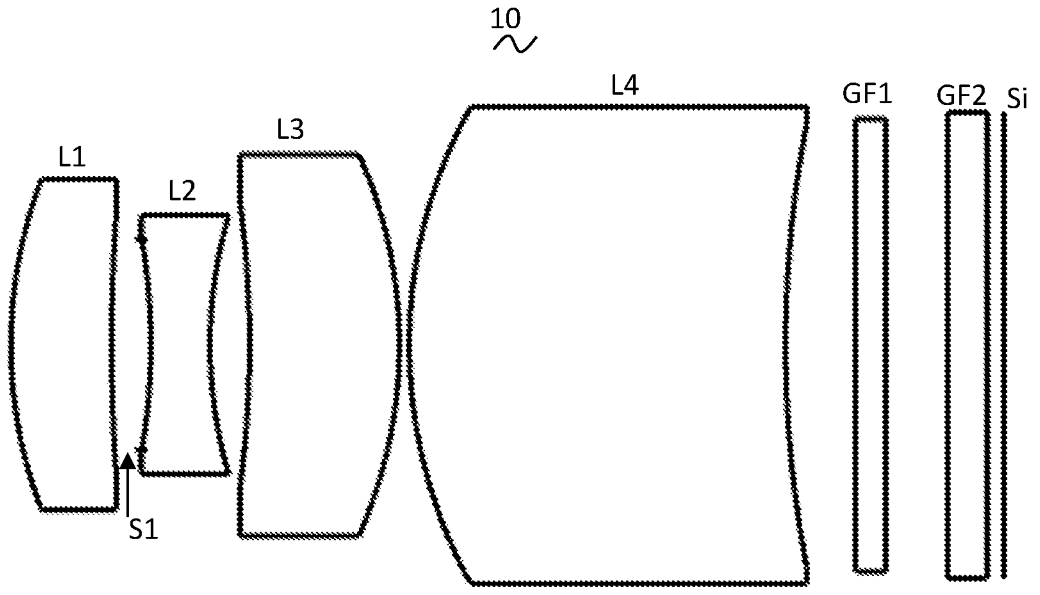
FIG. 1 is a structural schematic diagram of a camera optical lens according to Embodiment 1 of the present disclosure.

Referring to the drawings, the present disclosure provides a camera optical lens 10. FIG. 1 shows a camera optical lens 10 according to Embodiment 1 of the present disclosure. The camera optical lens 10 includes 4 lenses. The camera optical lens 10 sequentially includes: from an object side to an image side, a first lens L1, an aperture S1, a second lens L2, a third lens L3, and the fourth lens L4. Optical elements such as optical filters GF1, GF2 may be provided between the fourth lens L4 and the image plane S1.

The first lens L1, the second lens L2, the third lens L3, and the fourth lens L4 are made of glass. Proper selection of glass lenses can improve the optical performance of the camera optical lens. In other alternative embodiments, the lenses may be made of other materials.

A focal length of the camera optical lens 10 is defined as f, and a total optical length from an object side surface of the first lens to an image plane of the camera optical lens along an optic axis of the camera optical lens 10 is defined as TTL, and a following relational expression is satisfied: $1.50 \le TTL/f \le 2.50$, which specifies a ratio of the total optical length of the camera optical lens 10 to the focal length f of the camera optical lens 10. By being smaller than the upper limit value of the relational expression, TTL can be controlled to be shortened, and miniaturization can be easily achieved. On the other hand, by being greater than the lower limit value of the relational expression, distortion and on-axis chromatic aberration can be easily corrected, and good optical performance can be maintained.

A focal length of the first lens L1 is defined as f1, and a following relational expression is satisfied: 1.00≤f1/f≤1.50, which specifies a ratio of the focal length of the first lens L1 to the focal length of the camera optical lens 10. By reasonably distributing an optical focal length of the system, the system has better imaging quality and lower sensitivity.

A focal length of the second lens L2 is defined as f2, an on-axis thickness of the second lens L2 is defined as d3, and a following relational expression is satisfied: −12.00≤f2/d3<−4.00. When the relational expression is satisfied, it is helpful to buffer the variations of the incident angle of the large-view-angle light, so that the large-view-angle light is smoothly transmitted in the camera optical lens 10, while maintaining the refractive power intensity of the second lens L2, to improve chromatic aberration and improve imaging quality.

A refractive index of the first lens L1 is defined as n1, and a following relational expression is satisfied: n1≥1.70, the first lens L1 optionally made of a high-refractive-index material, which is beneficial to reducing the front-end aperture and improving the imaging quality.

An on-axis thickness of the third lens L3 is d5, an on-axis thickness of the fourth lens L4 is d7, and a following relational expression is satisfied: 1.50≤d7/d5≤5.00. Within the range of the relational expression, it is helpful to reduce TTL of the camera optical lens 10.

A central curvature radius of an object side surface of the third lens L3 is defined as R5, a central curvature radius of an image side surface of the third lens L3 is defined as R6, and a following relational expression is satisfied: 1.00≤R5/R6≤5.00, which specifies a shape of the third lens L3. Within the range of the relational expression, the deflection of light passing through the lens may be alleviated, the chromatic aberration is effectively corrected, so that the chromatic aberration |LC|≤1.2 μm.

An on-axis distance from an image side surface of the first lens L1 to an object side surface of the second lens L2 is d2, and a following relational expression is satisfied: 1.00≤d3/d2≤5.00. Within the range of the relational expression, it is helpful to reduce TTL of the camera optical lens 10.

An object side surface of the first lens L1 is convex in a paraxial region, an image side surface of the first lens L1 is concave in the paraxial region, and the first lens L1 has positive refractive power. In other optional embodiments, the object side surface and the image side surface of the first lens L1 may be provided with other concave and convex distributions.

The camera optical lens 10 satisfies a following relational expression: 0.50≤f1/f≤2.24, which specifies a ratio of the focal length f1 of the first lens L1 to the focal length of the camera optical lens 10. Within the range of the relational expression, it is beneficial to achieving ultra-wide-angle. Optionally, 0.80≤f1/f≤1.79 is satisfied.

A central curvature radius of an object side surface of the first lens L1 is defined as R1, a central curvature radius of an image side surface of the first lens L2 is defined as R2, and a following relational expression is satisfied: −3.68≤(R1+R2)/(R1−R2)≤−0.62, which specifies a shape of the first lens L1. Within the range of the relational expression, it is beneficial to achieving ultra-wide-angle. Optionally, −2.30≤(R1+R2)/(R1−R2)≤−0.77 is satisfied.

An on-axis thickness of the first lens L1 is d1, and a following relational expression is satisfied: 0.095≤d1/TTL≤0.150. Within the range of the relational expression, it is beneficial to achieving miniaturization.

An object side surface of the second lens L2 is concave in the paraxial region, an image side surface of the second lens L2 is concave in the paraxial region, and the second lens L2 has negative refractive power. In other optional embodiments, the object side surface and the image side surface of the second lens L2 may be provided with other concave and convex distributions.

The camera optical lens 10 satisfies a following relational expression: −2.24≤f2/f≤−0.41, which specifies a ratio of the focal length f2 of the second lens L2 to the focal length of the camera optical lens 10. Within the range of the relational expression, the field curvature of the system may be effectively balanced. Optionally, −1.40≤f2/f≤−0.51 is satisfied.

A central curvature radius of an object side surface of the second lens L2 is R3, a central curvature radius of an image side surface of the second lens L2 is R4, and a following relational expression is satisfied: 0.01≤(R3+R4)/(R3−R4)≤0.66, which specifies a shape of the second lens L2. Within the range of the relational expression, it is beneficial to achieving ultra-wide-angle. Optionally, 0.01≤(R3+R4)/(R3−R4)≤0.53 is satisfied.

The camera optical lens 10 satisfies a following relational expression: 0.034≤d3/TTL≤0.092. Within the range of the relational expression, it is beneficial to achieving miniaturization.

An object side surface of the third lens L3 is concave in a paraxial region, an image side surface of the third lens L3 is convex in the paraxial region, and the third lens L3 has positive refractive power. In other optional embodiments, the object side surface and the image side surface of the third lens L3 may be provided with other concave and convex distributions.

A focal length of the third lens L3 is f3, and a following relational expression is satisfied: 0.77≤f3/f≤8.67, the system has better imaging quality and lower sensitivity by reasonable distribution of refractive power. Optionally, 1.24≤f3/f≤6.93 is satisfied.

The camera optical lens 10 satisfies a following relational expression: 0.75≤(R5+R6)/(R5−R6)≤120.93, which specifies a shape of the third lens L3. Within the range of the relational expression, the degree of deflection is reduced, and chromatic aberration is effectively corrected. Optionally, 1.20≤(R5+R6)/(R5−R6)≤96.74 is satisfied.

The camera optical lens 10 satisfies a following relational expression: 0.054≤d5/TTL≤0.252. Within the range of the relational expression, it is beneficial to achieving miniaturization.

An object side surface of the fourth lens L4 is convex in the paraxial region, an image side surface of the fourth lens L4 is convex in the paraxial region, and the fourth lens L4 has positive refractive power. In other optional embodiments, the object side surface and the image side surface of the fourth lens L4 may be provided with other concave and convex distributions.

A focal length of the fourth lens L4 is f4, a following relational expression is satisfied: 0.45≤f4/f≤2.63, the system has better imaging quality and lower sensitivity through reasonable distribution of refractive power. Optionally, 0.73≤f4/f≤2.10 is satisfied.

An on-axis thickness of the fourth lens L4 is d7, a following relational expression is satisfied: 0.272≤d7/TTL≤0.382. Within the range of the relational expression, it is beneficial to achieving miniaturization.

The field of view of the camera optical lens 10 in a diagonal direction is defined as FOV, and a following relational expression is satisfied: FOV≥32.42°, which is beneficial to achieving wide-angle. Optionally, FOV≥32.75°.

An image height of the camera optical lens 10 is IH, and a following relational expression is satisfied: TTL/IH≤6.93, which is beneficial to achieving miniaturization. Optionally, TTL/IH≤6.73 is satisfied.

An F-number FNO of the camera optical lens 10 is smaller than or equal to 2, which may achieve large-aperture and good imaging performance.

The camera optical lens 10 has good optical performance; and the camera optical lens 10 is particularly suitable for a vehicle-mounted lens, a mobile phone camera lens assembly and a WEB camera lens which are composed of camera elements such as CCD and CMOS with high resolution.

The camera optical lens 10 of the present disclosure will be described below by way of examples. The reference signs recited in the examples are shown below. The units of the focal length, the on-axis distance, the central curvature radius, and the on-axis thickness are mm.

TTL denotes a total optical length from the object side surface of the first lens to an image plane of the camera optical lens along an optic axis (the on-axis distance from the object-side surface of the first lens L1 to the image plane S1), and its unit is mm.

F-number FNO refers to a ratio of the effective focal length of the camera optical lens to the entrance pupil diameter of the camera optical lens.

Table 1 shows design data of the camera optical lens 10 according to Embodiment 1 of the present disclosure.

TABLE 1

| | R | d | | | nd | | vd |
|---|---|---|---|---|---|---|---|
| S1 | ∞ | d0 = | −1.311 | | | | |
| R1 | 4.636 | d1 = | 1.015 | nd1 | 2.0007 | v1 | 25.44 |
| R2 | 17.803 | d2 = | 0.396 | | | | |
| R3 | −6.200 | d3 = | 0.598 | nd2 | 1.5928 | v2 | 68.35 |
| R4 | 4.649 | d4 = | 0.397 | | | | |
| R5 | −10.742 | d5 = | 1.512 | nd3 | 2.0007 | v3 | 25.44 |
| R6 | −4.727 | d6 = | 0.100 | | | | |
| R7 | 4.963 | d7 = | 3.796 | nd4 | 1.8010 | v4 | 34.97 |
| R8 | 11.821 | d8 = | 0.710 | | | | |
| R9 | ∞ | d9 = | 0.300 | ndg1 | 1.5168 | vg1 | 64.17 |
| R10 | ∞ | d10 = | 0.626 | | | | |
| R11 | ∞ | d11 = | 0.400 | ndg2 | 1.5168 | vg2 | 64.17 |
| R12 | ∞ | d12 = | 0.169 | | | | |

The meaning of each reference sign is as follows.

S1: aperture;

R: curvature radius at the center of the optical surface;

R1: central curvature radius of the object side surface of the first lens L1;

R2: central curvature radius of the image side surface of the first lens L1;

R3: central curvature radius of the object side surface of the second lens L2;

R4: central curvature radius of the image side surface of the second lens L2;

R5: central curvature radius of the object side surface of the third lens L3;

R6: central curvature radius of the image side surface of the third lens L3;

R7: central curvature radius of the object side surface of the fourth lens L4;

R8: central curvature radius of the image side surface of the fourth lens L4;

R9: central curvature radius of the object side surface of the optical filter GF1;

R10: central curvature radius of the image side surface of the optical filter GF;

R11: central curvature radius of the object side surface of the optical filter GF2;

R12: central curvature radius of the image side surface of the optical filter GF2;

d: on-axis thickness of lenses, and on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the optical filter GF1;

d9: on-axis thickness of the optical filter GF1;

d10: on-axis distance from the image side surface of the optical filter GF1 to the object side surface of the optical filter GF2;

d11: on-axis thickness of the optical filter GF2;

d12: on-axis distance from the image side surface of the optical filter GF2 to the image plane S1;

nd: refractive index of d line (d line corresponds to green light with a wavelength of 550 nm);

nd1: refractive index of d line of the first lens L1;

nd2: refractive index of d line of the second lens L2;

nd3: refractive index of d line of the third lens L3;

nd4: refractive index of d line of the fourth lens L4;

ndg1: refractive index of d line of the optical filter GF1;

ndg2: refractive index of d line of the optical filter GF2;

vd: abbe number;

v1: abbe number of the first lens L1;

v2: abbe number of the second lens L2;

v3: abbe number of the third lens L3;

v4: abbe number of the fourth lens L4;

vg1: abbe number of the optical filter GF1;

vg2: abbe number of the optical filter GF2.

Figure 2:
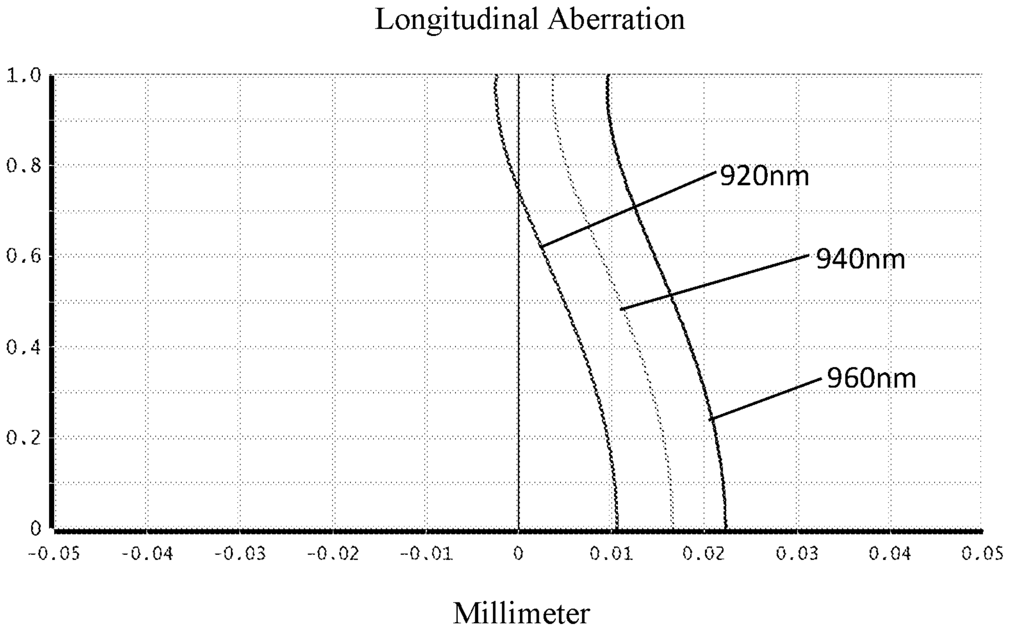
FIG. 2 is a schematic diagram of longitudinal aberration of the camera optical lens shown in FIG. 1.
Figure 3:
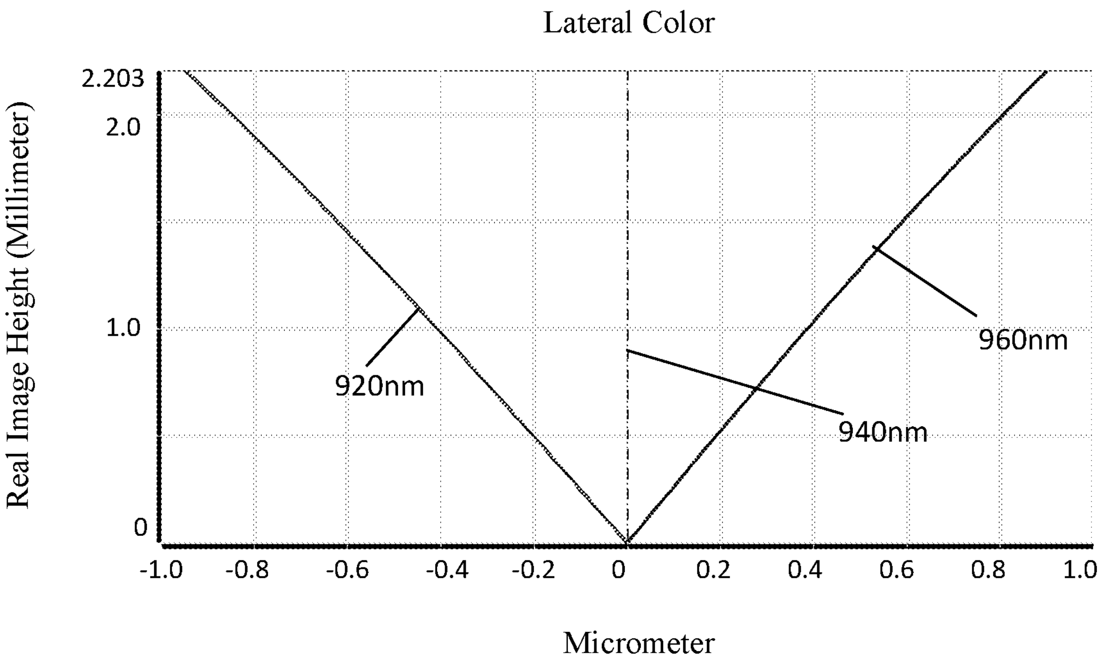
FIG. 3 is a schematic diagram of lateral color of the camera optical lens shown in FIG. 1.
Figure 4:
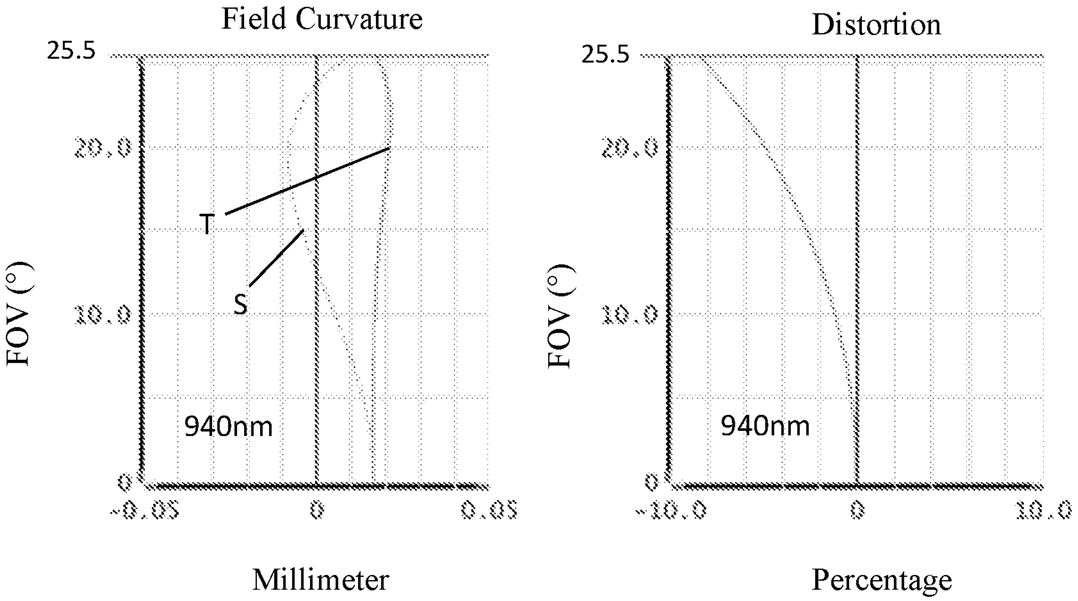
FIG. 4 is a schematic diagram of field curvature and distortion of the camera optical lens shown in FIG. 1.

FIG. 2 and FIG. 3 respectively show longitudinal aberration and lateral color of light with wavelengths of 960 nm, 940 nm and 920 nm after passing through the camera optical lens 10 according to Embodiment 1. FIG. 4 shows field curvature and distortion of light with a wavelength of 940 nm after passing through the camera optical lens 10 according to Embodiment 1, the field curvature S in FIG. 4 is a field curvature in a sagittal direction, and T is a field curvature in a meridian direction.

Table 7 appearing later shows various values in embodiments and values corresponding to the parameters specified in the relational expressions.

As shown in Table 7, Embodiment 1 satisfies each relational expression.

In this embodiment, the entrance pupil diameter ENPD of the camera optical lens 10 is 2.517 mm, the full field of view image height IH is 2.203 mm, and the field of view FOV in a diagonal direction is 50.99°, the camera optical lens 10 has large aperture and excellent optical performance, its on-axis and off-axis chromatic aberrations are fully corrected.

Embodiment 2

Embodiment 2 is substantially the same as Embodiment 1, and the reference signs have the same meaning as Embodiment 1, and only differences are listed below.

Figure 5:
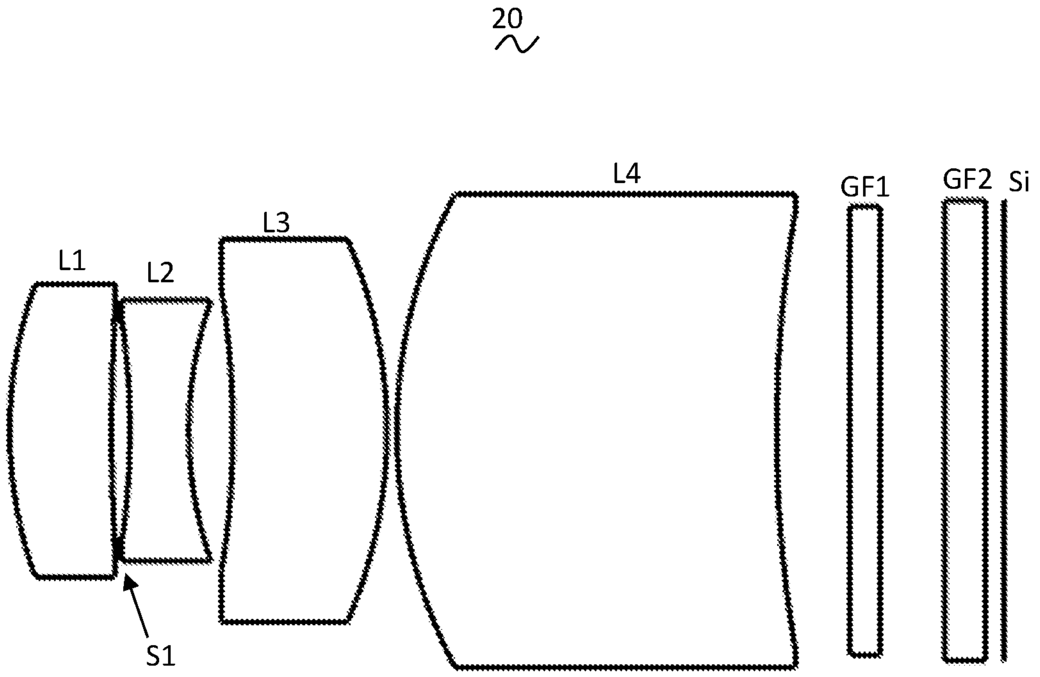
FIG. 5 is a structural schematic diagram of a camera optical lens according to Embodiment 2 of the present disclosure.

FIG. 5 shows a camera optical lens 20 according to Embodiment 2 of the present disclosure.

Table 2 shows design data of a camera optical lens 20 according to Embodiment 2 of the present disclosure.

TABLE 2

| | R | | d | | nd | | vd |
|---|---|---|---|---|---|---|---|
| S1 | ∞ | d0 = | −1.070 | | | | |
| R1 | 4.316 | d1 = | 1.020 | nd1 | 2.0007 | v1 | 25.44 |
| R2 | 20.072 | d2 = | 0.183 | | | | |
| R3 | −7.672 | d3 = | 0.590 | nd2 | 1.5928 | v2 | 68.35 |
| R4 | 3.946 | d4 = | 0.440 | | | | |
| R5 | −8.736 | d5 = | 1.541 | nd3 | 2.0007 | v3 | 25.44 |
| R6 | −4.827 | d6 = | 0.100 | | | | |
| R7 | 5.107 | d7 = | 3.800 | nd4 | 1.8503 | v4 | 32.31 |
| R8 | 12.888 | d8 = | 0.734 | | | | |
| R9 | ∞ | d9 = | 0.300 | ndg1 | 1.5168 | vg1 | 64.17 |
| R10 | ∞ | d10 = | 0.651 | | | | |
| R11 | ∞ | d11 = | 0.400 | ndg2 | 1.5168 | vg2 | 64.17 |
| R12 | ∞ | d12 = | 0.193 | | | | |

Figure 6:
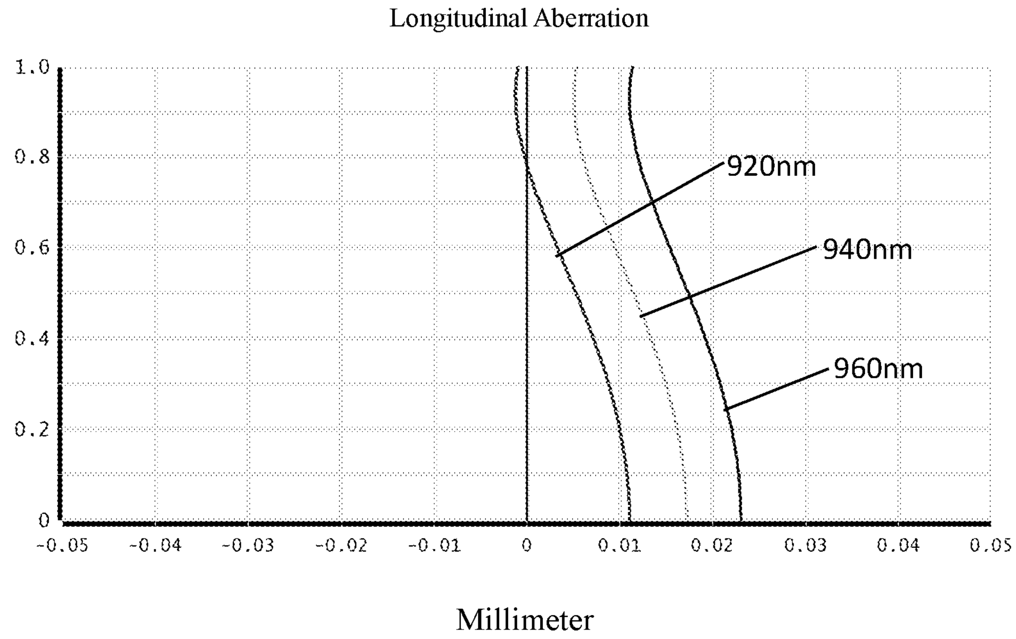
FIG. 6 is a schematic diagram of longitudinal aberration of the camera optical lens shown in FIG. 5.
Figure 7:
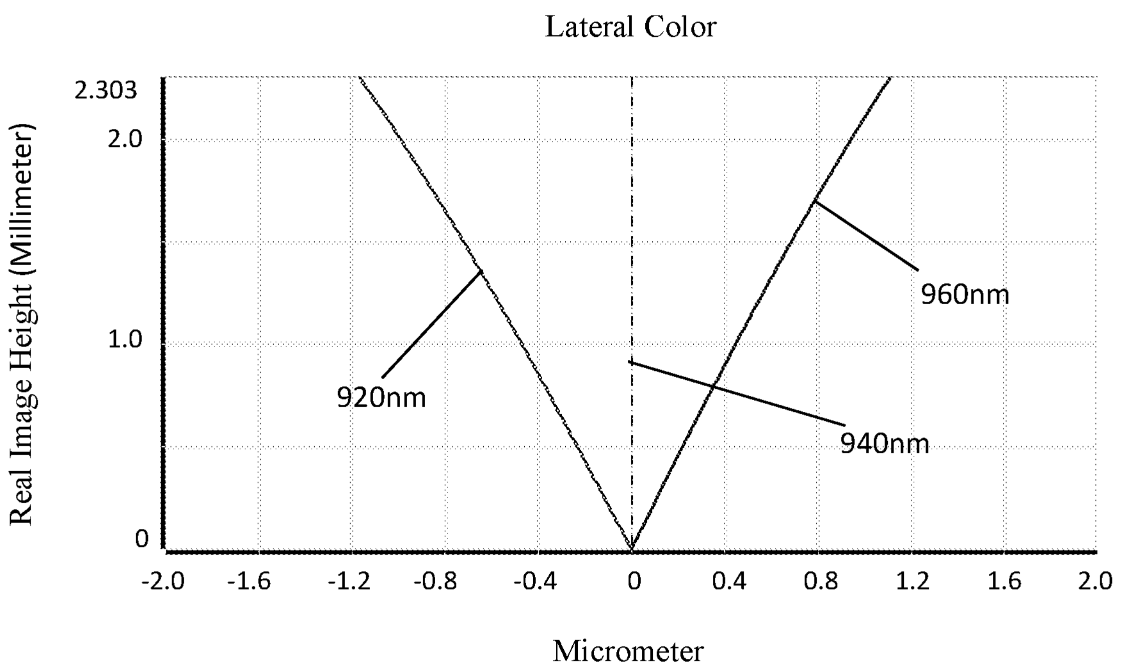
FIG. 7 is a schematic diagram of lateral color of the camera optical lens shown in FIG. 5.
Figure 8:
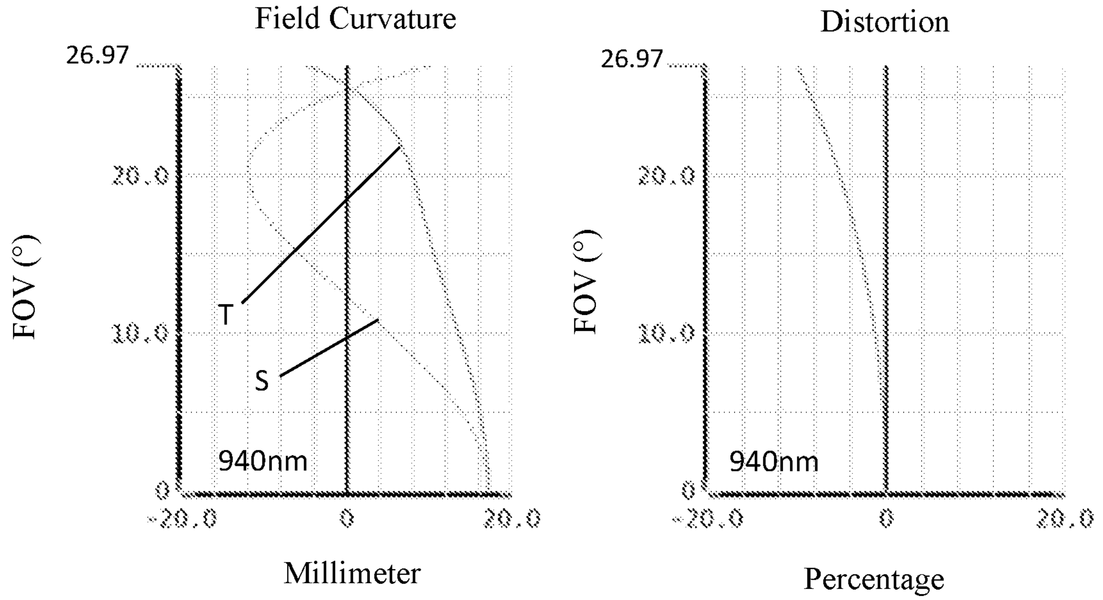
FIG. 8 is a schematic diagram of field curvature and distortion of the camera optical lens shown in FIG. 5.

FIG. 6 and FIG. 7 respectively show longitudinal aberration and lateral color of light with wavelengths of 960 nm, 940 nm and 920 nm after passing through the camera optical lens 20 according to Embodiment 2. FIG. 8 shows field curvature and distortion of light with a wavelength of 940 nm after passing through the camera optical lens 20 according to Embodiment 2. The field curvature S in FIG. 8 is the field curvature in a sagittal direction, and T is the field curvature in a meridian direction.

As shown in Table 7, Embodiment 2 satisfies corresponding relational expressions.

In this embodiment, the entrance pupil diameter ENPD of the camera optical lens 20 is 2.509 mm, the full field of view image height IH is 2.203 mm, and the field of view FOV in a diagonal direction is 53.94°, the camera optical lens 20 has large aperture and excellent optical performance, its on-axis and off-axis chromatic aberrations are fully corrected.

Embodiment 3

Embodiment 3 is substantially the same as Embodiment 1, and the reference signs have the same meaning as Embodiment 1, and only differences are listed below.

Figure 9:
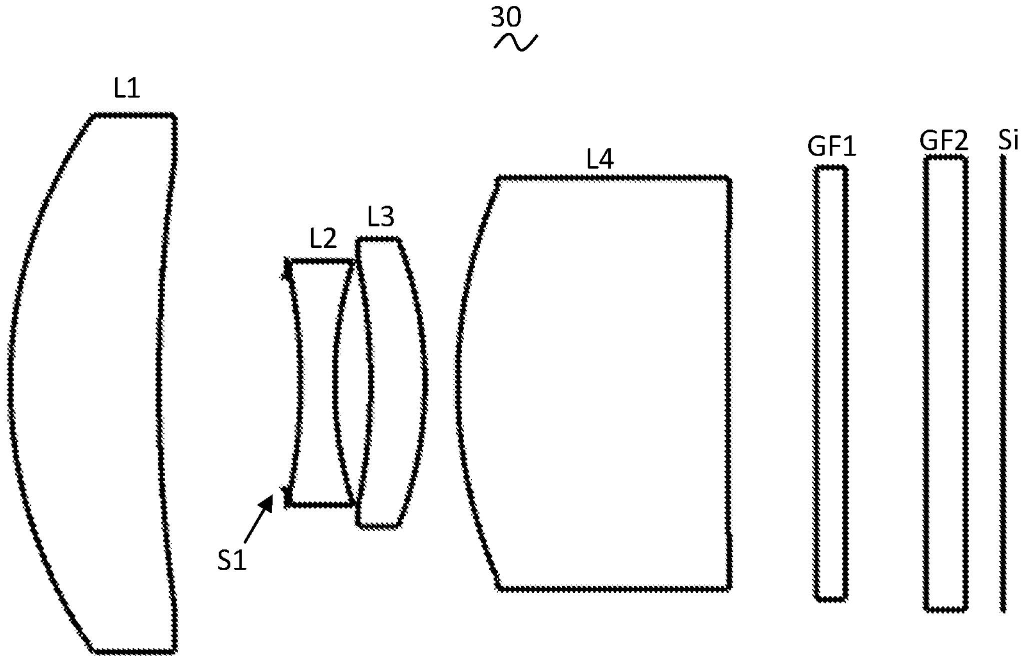
FIG. 9 is a structural schematic diagram of a camera optical lens according to Embodiment 3 of the present disclosure.

FIG. 9 shows a camera optical lens 30 according to Embodiment 3 of the present disclosure.

Table 3 shows design data of the camera optical lens 30 according to Embodiment 3 of the present disclosure.

TABLE 3

| | R | | d | | nd | | vd |
|---|---|---|---|---|---|---|---|
| S1 | ∞ | d0 = | −2.837 | | | | |
| R1 | 4.860 | d1 = | 1.524 | nd1 | 2.0007 | v1 | 25.44 |
| R2 | 16.409 | d2 = | 1.454 | | | | |
| R3 | −5.827 | d3 = | 0.351 | nd2 | 1.5928 | v2 | 68.35 |
| R4 | 4.223 | d4 = | 0.369 | | | | |
| R5 | −6.183 | d5 = | 0.557 | nd3 | 2.0007 | v3 | 25.44 |
| R6 | −4.067 | d6 = | 0.337 | | | | |
| R7 | 5.151 | d7 = | 2.774 | nd4 | 1.8010 | v4 | 34.97 |
| R8 | 180.693 | d8 = | 0.905 | | | | |
| R9 | ∞ | d9 = | 0.300 | ndg1 | 1.5168 | vg1 | 64.17 |
| R10 | ∞ | d10 = | 0.833 | | | | |
| R11 | ∞ | d11 = | 0.400 | ndg2 | 1.5168 | vg2 | 64.17 |
| R12 | ∞ | d12 = | 0.387 | | | | |

Figure 10:
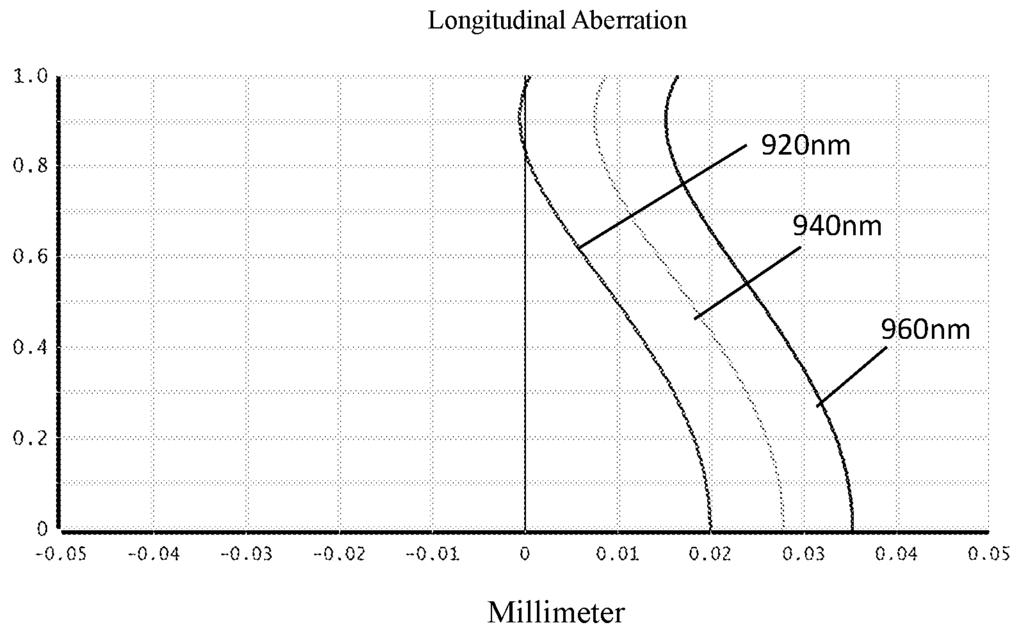
FIG. 10 is a schematic diagram of longitudinal aberration of the camera optical lens shown in FIG. 9.
Figure 11:
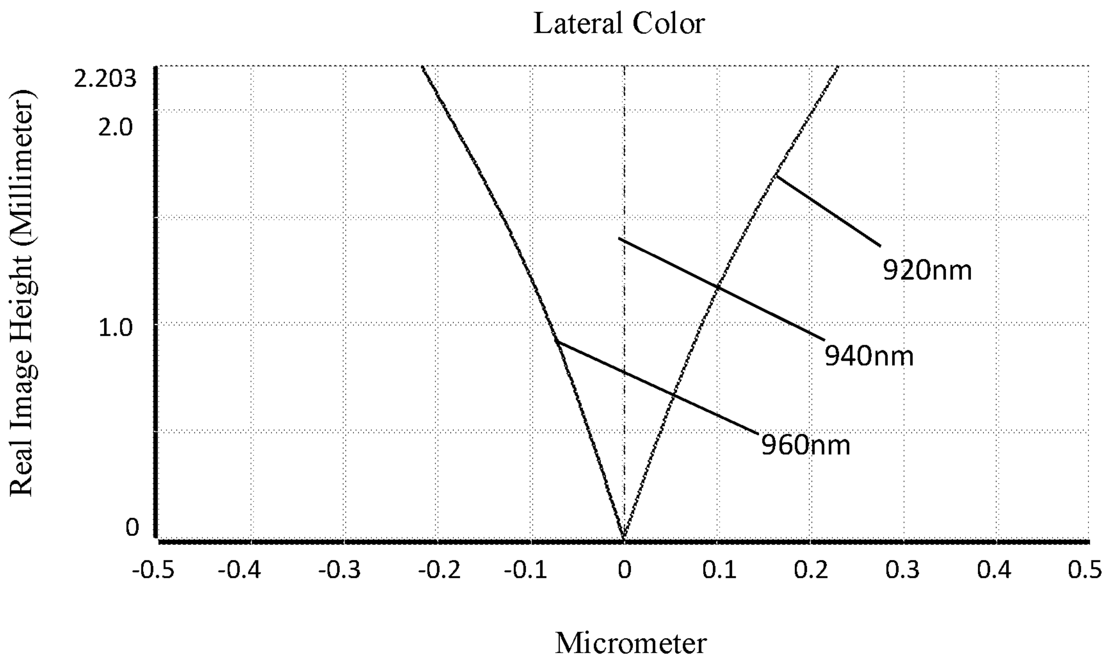
FIG. 11 is a schematic diagram of lateral color of the camera optical lens shown in FIG. 9.
Figure 12:
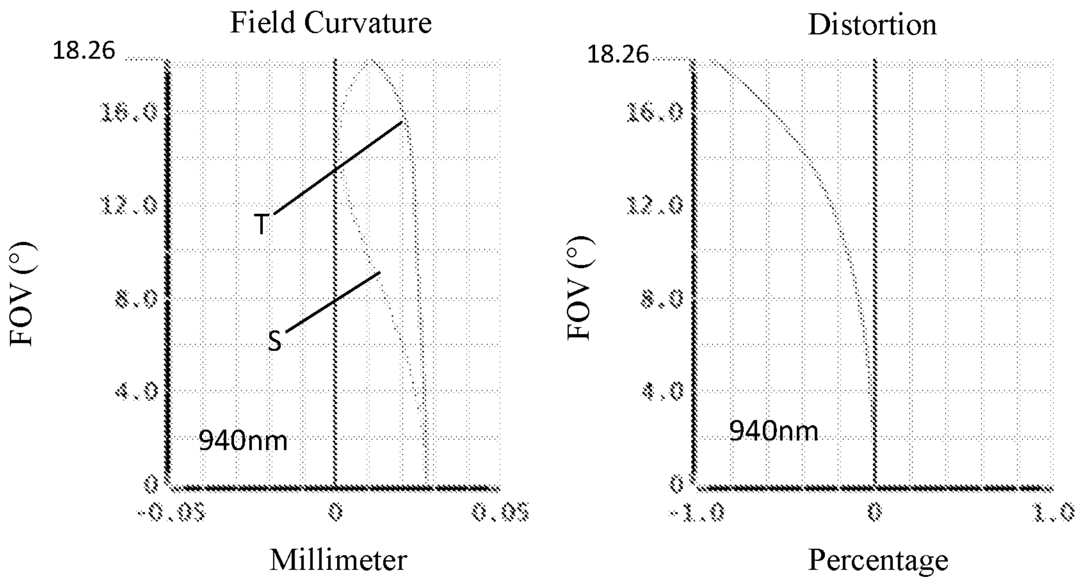
FIG. 12 is a schematic diagram of field curvature and distortion of the camera optical lens shown in FIG. 9.

FIG. 10 and FIG. 11 respectively show longitudinal aberration and lateral color of light with wavelengths of 960 nm, 940 nm and 920 nm after passing through the camera optical lens 30 according to Embodiment 3. FIG. 12 shows field curvature and distortion of light with a wavelength of 940 nm after passing through the camera optical lens 30 according to Embodiment 3. The field curvature S in FIG. 12 is the field curvature in a sagittal direction, and T is the field curvature in a meridian direction.

Following Table 7 lists values corresponding to relational expressions in this embodiment according to the above relational expressions. The camera optical lens 30 of the present embodiment satisfies the above relational expressions.

In this embodiment, the entrance pupil diameter ENPD of the camera optical lens 30 is 3.352 mm, the full field of view image height IH is 2.203 mm, and the field of view FOV in a diagonal direction is 36.52°, the camera optical lens 30 has large aperture and excellent optical performance, its on-axis and off-axis chromatic aberrations are fully corrected.

Embodiment 4

Embodiment 4 is substantially the same as Embodiment 1, and the reference signs have the same meaning as Embodiment 1, and only differences are listed below.

Figure 13:
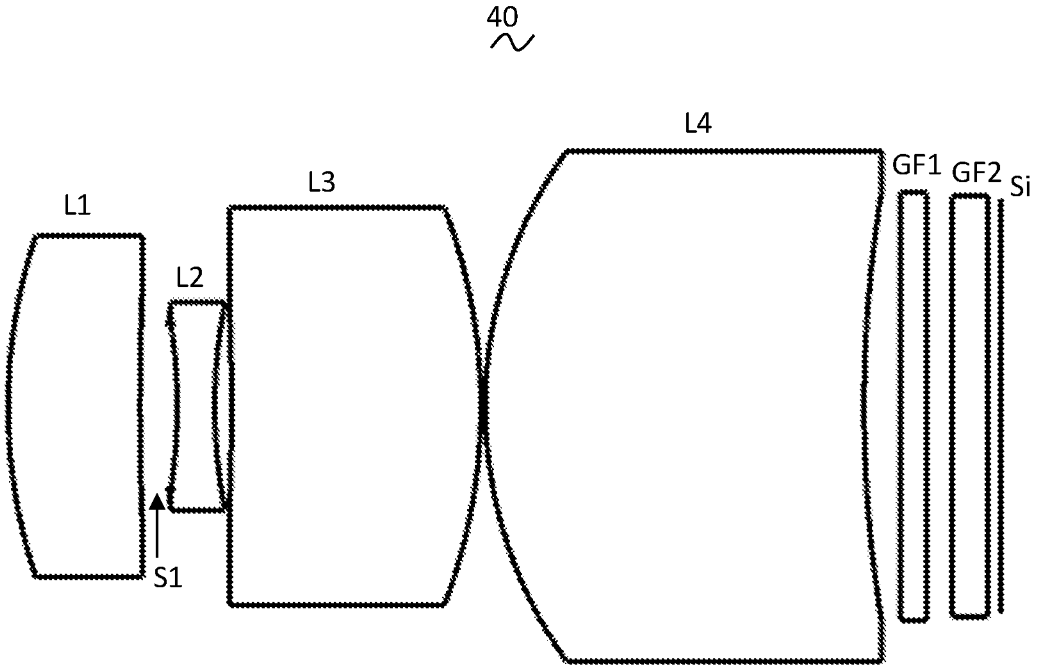
FIG. 13 is a structural schematic diagram of a camera optical lens according to Embodiment 4 of the present disclosure.

FIG. 13 shows a camera optical lens 40 according to Embodiment 4 of the present disclosure.

Table 4 shows design data of the camera optical lens 40 according to Embodiment 4 of the present disclosure.

TABLE 4

| | R | | d | | nd | | vd |
|---|---|---|---|---|---|---|---|
| S1 | ∞ | d0 = | −1.841 | | | | |
| R1 | 6.105 | d1 = | 1.500 | nd1 | 2.0007 | v1 | 25.44 |
| R2 | 36.342 | d2 = | 0.422 | | | | |
| R3 | −6.151 | d3 = | 0.427 | nd2 | 1.5928 | v2 | 68.35 |
| R4 | 5.959 | d4 = | 0.190 | | | | |
| R5 | −31.472 | d5 = | 2.836 | nd3 | 2.0007 | v3 | 25.44 |
| R6 | −6.320 | d6 = | 0.050 | | | | |
| R7 | 5.001 | d7 = | 4.305 | nd4 | 1.8503 | v4 | 32.31 |
| R8 | 14.971 | d8 = | 0.412 | | | | |
| R9 | ∞ | d9 = | 0.300 | ndg1 | 1.5168 | vg1 | 64.17 |
| R10 | ∞ | d10 = | 0.292 | | | | |
| R11 | ∞ | d11 = | 0.400 | ndg2 | 1.5168 | vg2 | 64.17 |
| R12 | ∞ | d12 = | 0.152 | | | | |

Figure 14:
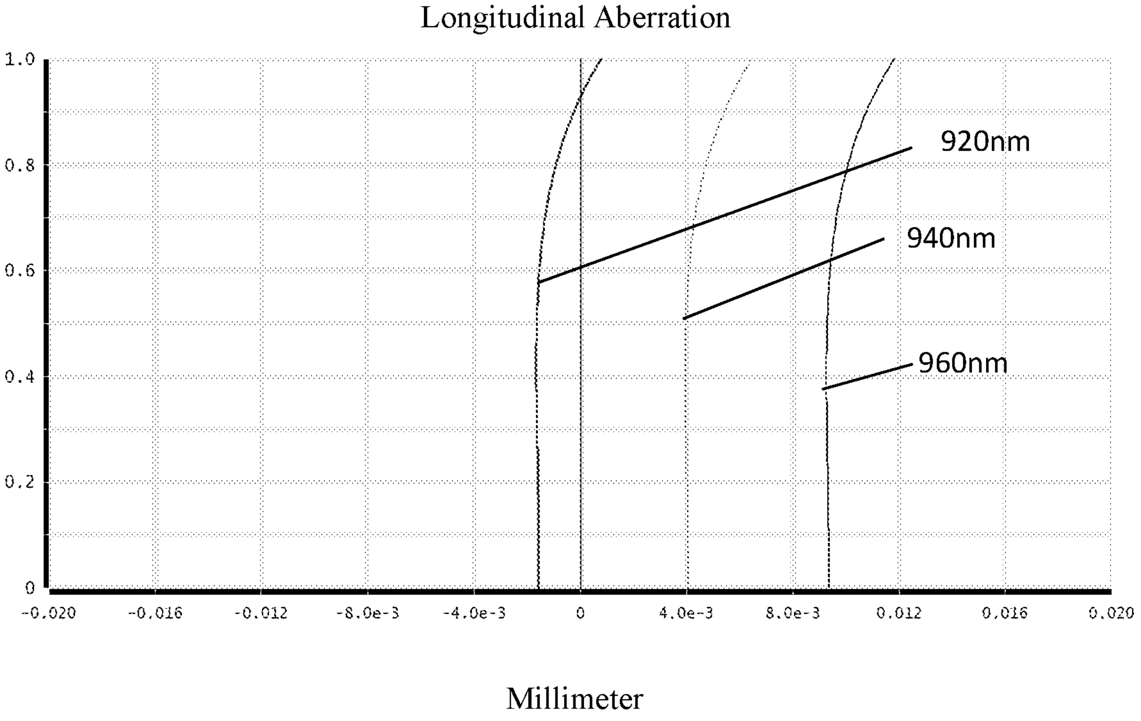
FIG. 14 is a schematic diagram of longitudinal aberration of the camera optical lens shown in FIG. 13.
Figure 15:
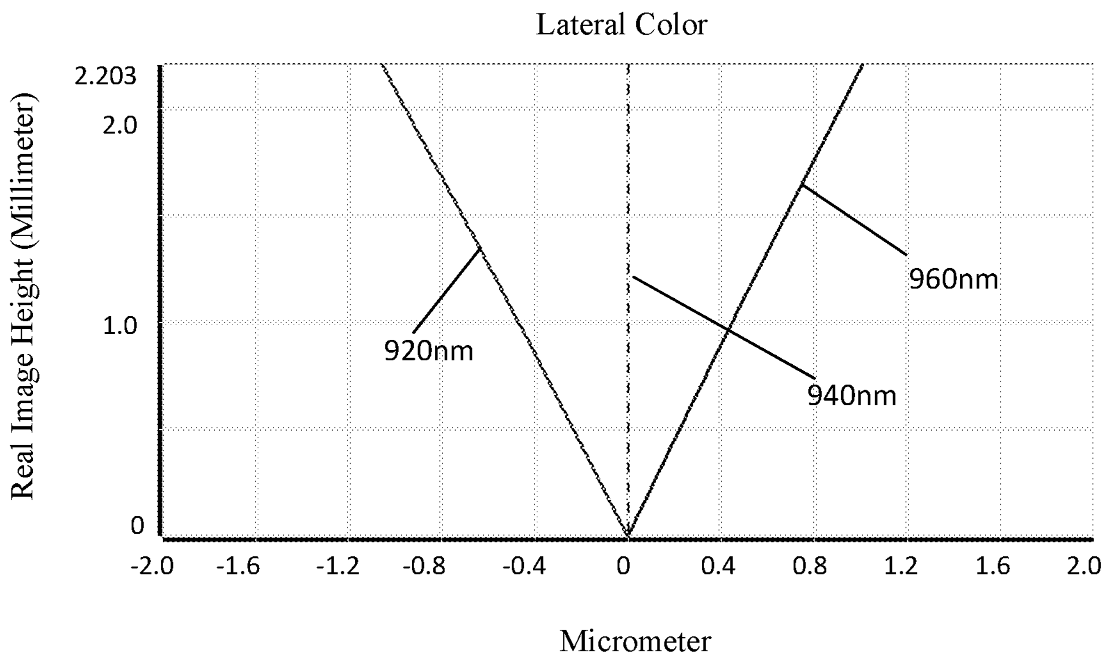
FIG. 15 is a schematic diagram of lateral color of the camera optical lens shown in FIG. 13.
Figure 16:
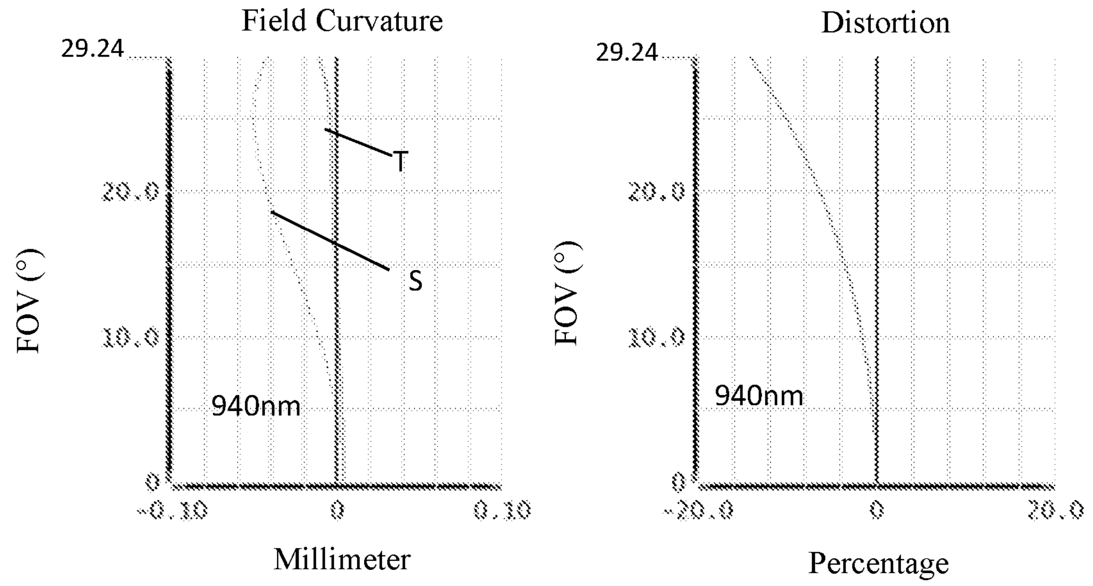
FIG. 16 is a schematic diagram of field curvature and distortion of the camera optical lens shown in FIG. 13.

FIG. 14 and FIG. 15 respectively show longitudinal aberration and lateral color of light with wavelengths of 960 nm, 940 nm and 920 nm after passing through the camera optical lens 40 according to Embodiment 4. FIG. 16 shows field curvature and distortion of light with a wavelength of 940 nm after passing through the camera optical lens 40 according to Embodiment 4. The field curvature S in FIG. 16 is the field curvature in a sagittal direction, and T is the field curvature in a meridian direction.

Following Table 7 lists values corresponding to relational expressions in this embodiment according to the above relational expressions. The camera optical lens 40 of the present embodiment satisfies the above relational expressions.

In this embodiment, the entrance pupil diameter ENPD of the camera optical lens 40 is 2.284 mm, the full field of view image height IH is 2.203 mm, and the field of view FOV in a diagonal direction is 58.47°, the camera optical lens 40 has large aperture and excellent optical performance, its on-axis and off-axis chromatic aberrations are fully corrected.

Embodiment 5

Embodiment 5 is substantially the same as Embodiment 1, and the reference signs have the same meaning as Embodiment 1, and only differences are listed below.

Figure 17:
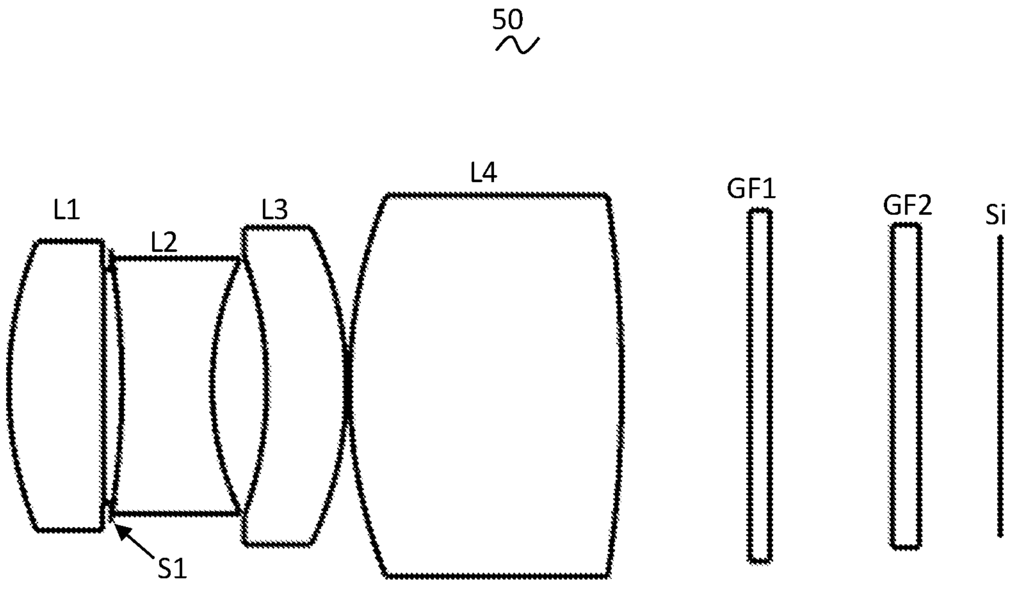
FIG. 17 is a structural schematic diagram of a camera optical lens according to Embodiment 5 of the present disclosure.

FIG. 17 shows a camera optical lens 50 according to Embodiment 5 of the present disclosure. An image side surface of the first lens L1 is convex in the paraxial region, and an image side surface of the fourth lens L4 is convex in the paraxial region.

Table 5 shows design data of the camera optical lens 50 according to Embodiment 5 of the present disclosure.

TABLE 5

| | R | | d | | nd | | vd |
|---|---|---|---|---|---|---|---|
| S1 | ∞ | d0 = | −1.501 | | | | |
| R1 | 5.611 | d1 = | 1.393 | nd1 | 1.7130 | v1 | 53.87 |
| R2 | −154.213 | d2 = | 0.266 | | | | |
| R3 | −11.493 | d3 = | 1.325 | nd2 | 1.5928 | v2 | 68.35 |
| R4 | 4.437 | d4 = | 0.799 | | | | |
| R5 | −5.591 | d5 = | 1.167 | nd3 | 2.0007 | v3 | 25.44 |
| R6 | −5.454 | d6 = | 0.049 | | | | |
| R7 | 7.535 | d7 = | 3.989 | nd4 | 1.8503 | v4 | 32.31 |
| R8 | −18.688 | d8 = | 1.874 | | | | |
| R9 | ∞ | d9 = | 0.300 | ndg1 | 1.5168 | vg1 | 64.17 |
| R10 | ∞ | d10 = | 1.788 | | | | |
| R11 | ∞ | d11 = | 0.400 | ndg2 | 1.5168 | vg2 | 64.17 |
| R12 | ∞ | d12 = | 1.188 | | | | |

Figure 18:
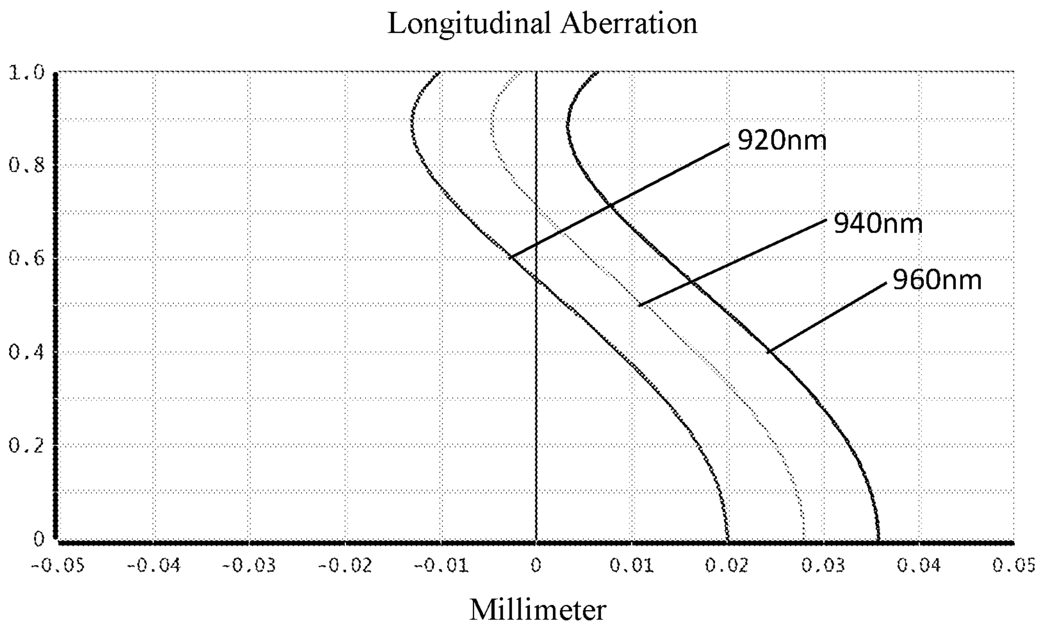
FIG. 18 is a schematic diagram of longitudinal aberration of the camera optical lens shown in FIG. 17.
Figure 19:
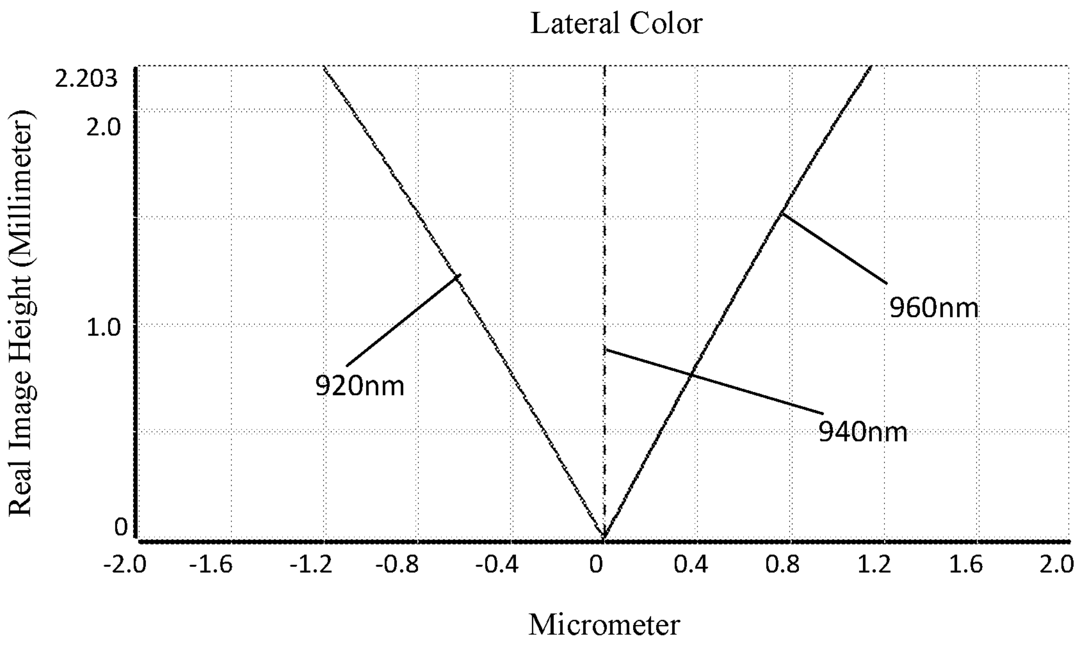
FIG. 19 is a schematic diagram of lateral color of the camera optical lens shown in FIG. 17.
Figure 20:
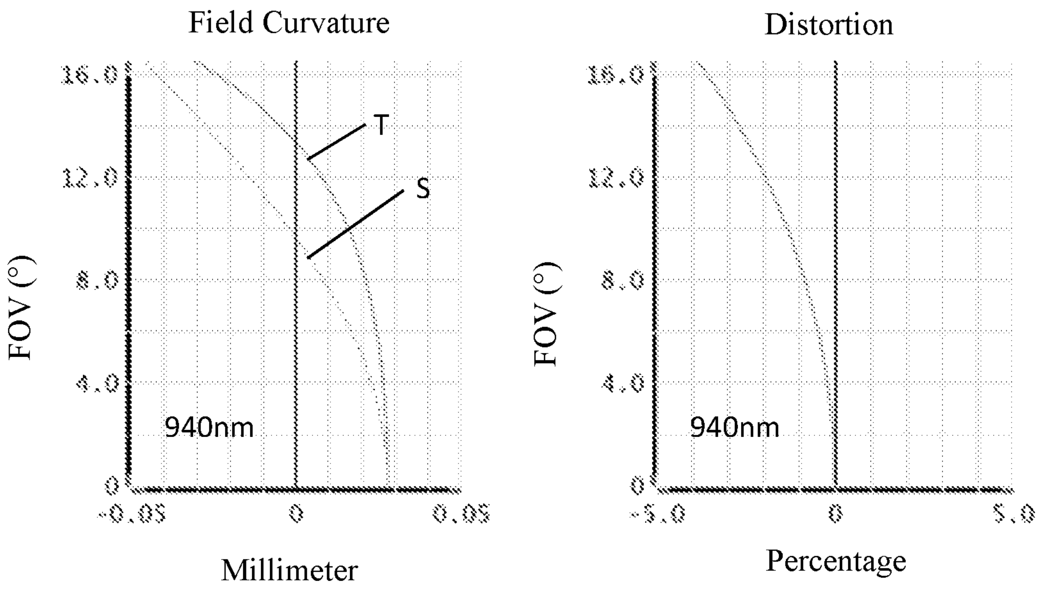
FIG. 20 is a schematic diagram of field curvature and distortion of the camera optical lens shown in FIG. 17.

FIG. 18 and FIG. 19 respectively show longitudinal aberration and lateral color of light with wavelengths of 960 nm, 940 nm and 920 nm after passing through the camera optical lens 50 according to Embodiment 5. FIG. 20 shows field curvature and distortion of light with a wavelength of 940 nm after passing through the camera optical lens 50 according to Embodiment 5. The field curvature S in FIG. 20 is the field curvature in a sagittal direction, and T is the field curvature in a meridian direction.

Following Table 7 lists values corresponding to relational expressions in this embodiment according to the above relational expressions. The camera optical lens 50 of the present embodiment satisfies the above relational expressions.

In this embodiment, the entrance pupil diameter ENPD of the camera optical lens 50 is 3.846 mm, the full field of view image height IH is 2.203 mm, and the field of view FOV in a diagonal direction is 33.08°, the camera optical lens 50 has large aperture and excellent optical performance, its on-axis and off-axis chromatic aberrations are fully corrected.

Comparative Embodiment

The comparative embodiment is basically the same as Embodiment 1, the reference signs meaning is the same as that of Embodiment 1, and only differences are listed below.

Figure 21:
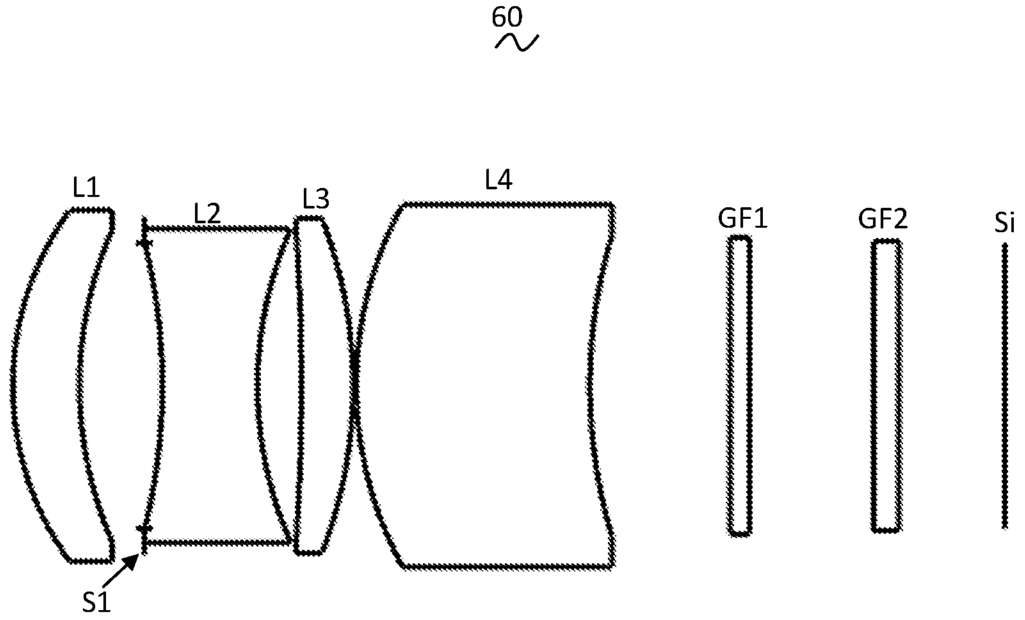
FIG. 21 is a schematic structural diagram of a camera optical lens according to Comparative Embodiment of the present disclosure.

FIG. 21 shows a camera optical lens 60 according to Comparative Embodiment.

Table 6 shows design data of the camera optical lens 60 according to Comparative Embodiment.

TABLE 6

| | R | | d | | nd | | vd |
|---|---|---|---|---|---|---|---|
| S1 | ∞ | d0 = | −2.043 | | | | |
| R1 | 4.634 | d1 = | 1.040 | nd1 | 2.0007 | v1 | 25.44 |
| R2 | 6.038 | d2 = | 1.287 | | | | |
| R3 | −9.093 | d3 = | 1.483 | nd2 | 1.5928 | v2 | 68.35 |
| R4 | 5.980 | d4 = | 0.683 | | | | |
| R5 | −34.931 | d5 = | 0.804 | nd3 | 2.0007 | v3 | 25.44 |
| R6 | −7.165 | d6 = | 0.049 | | | | |
| R7 | 5.831 | d7 = | 3.636 | nd4 | 1.8010 | v4 | 34.97 |
| R8 | 8.074 | d8 = | 2.188 | | | | |
| R9 | ∞ | d9 = | 0.300 | ndg1 | 1.5168 | vg1 | 64.17 |
| R10 | ∞ | d10 = | 1.929 | | | | |
| R11 | ∞ | d11 = | 0.400 | ndg2 | 1.5168 | vg2 | 64.17 |
| R12 | ∞ | d12 = | 1.645 | | | | |

Figure 22:
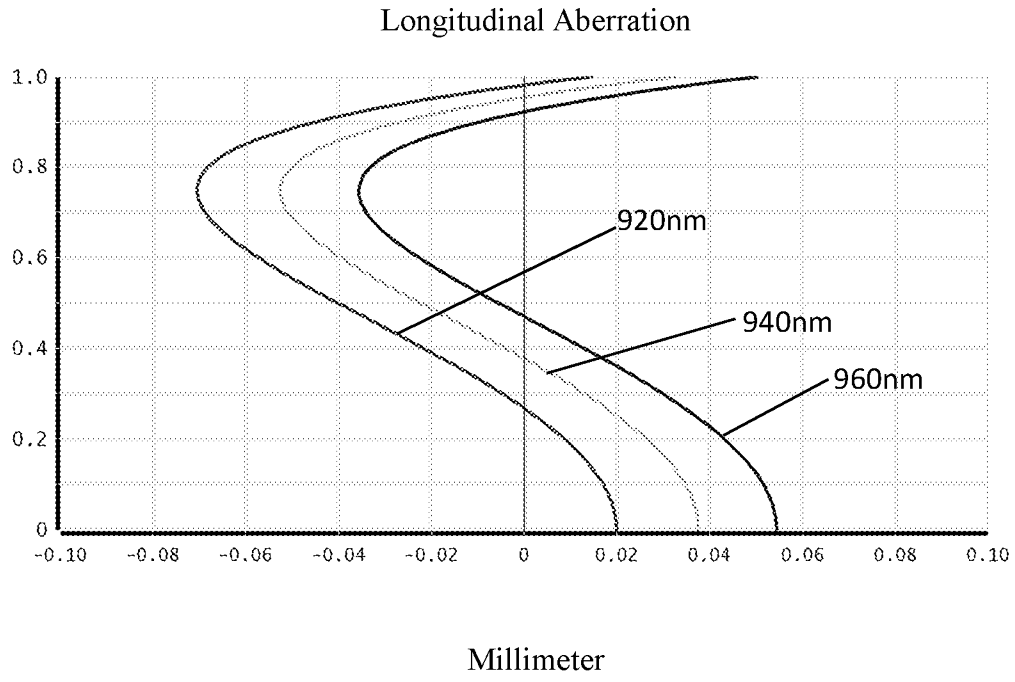
FIG. 22 is a schematic diagram of longitudinal aberration of the camera optical lens shown in FIG. 21.
Figure 23:
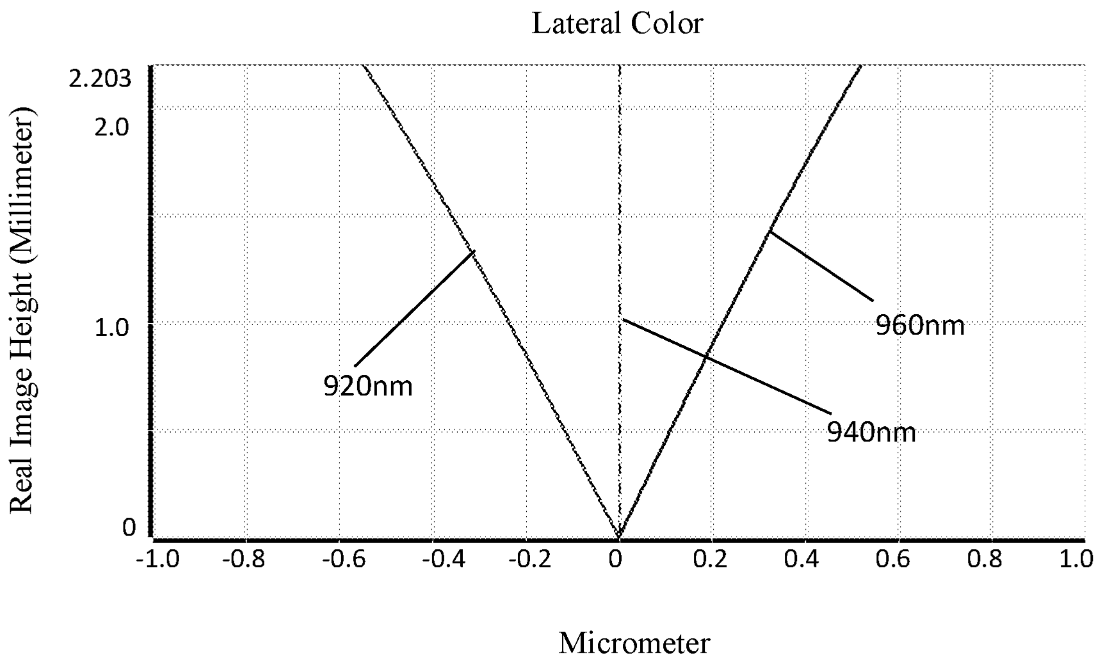
FIG. 23 is a schematic diagram of lateral color of the camera optical lens shown in FIG. 21.
Figure 24:
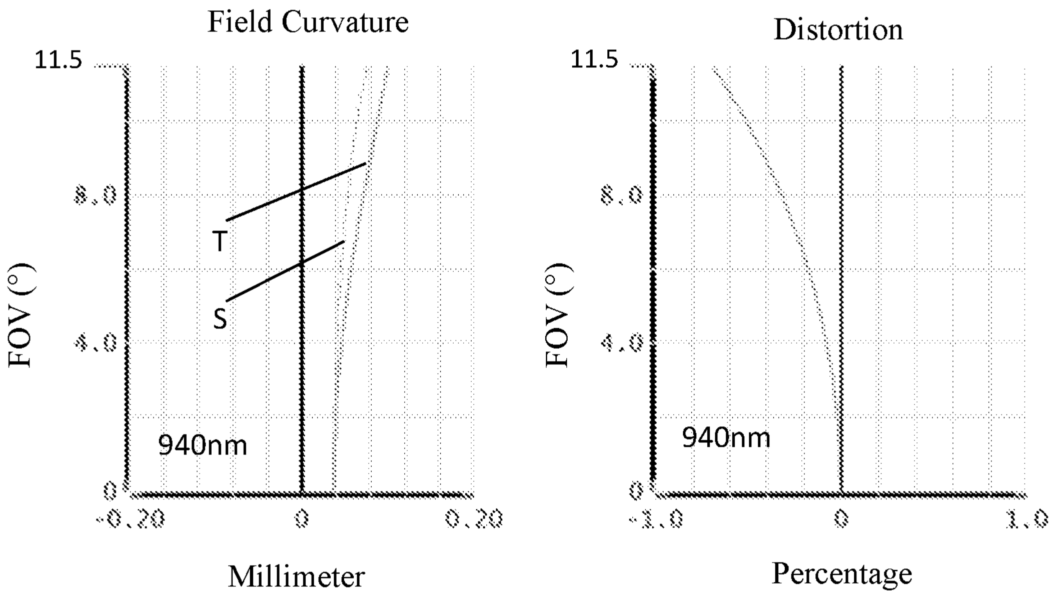
FIG. 24 is a schematic diagram of field curvature and distortion of the camera optical lens shown in FIG. 21.

FIG. 22 and FIG. 23 respectively show longitudinal aberration and lateral color of light with wavelengths of 960 nm, 940 nm and 920 nm after passing through the camera optical lens 60 according to Comparative Embodiment. FIG. 24 shows field curvature and distortion of light with a wavelength of 940 nm after passing through the camera optical lens 60 according to Comparative Embodiment. The field curvature S in FIG. 24 is the field curvature in a sagittal direction, and T is the field curvature in a meridian direction.

Following Table 7 lists values corresponding to each relational expression in this embodiment according to the above relational expressions. The camera optical lens 60 of the present embodiment satisfies the above relational expressions.

In this embodiment, the entrance pupil diameter ENPD of the camera optical lens 60 is 5.398 mm, the full field of view image height IH is 2.203 mm, and the field of view FOV in a diagonal direction is 22.99°.

Table 7 below lists values corresponding to each relational expression in Comparative Embodiment according to the above relational expressions. The camera optical lens 60 of Comparative Embodiment does not satisfy the above relational expression $-30.00 \leq f1/d1 \leq -8.00$, and the chromatic aberration cannot be improved.

TABLE 7

| Parameters and Relational Expressions | Embodiment 1 | Embodiment 2 | Embodiment 3 | Embodiment 4 | Embodiment 5 | Comparative Embodiment |
|---|---|---|---|---|---|---|
| TTL/f | 1.990 | 1.983 | 1.520 | 2.470 | 1.890 | 1.431 |
| f1/f | 1.241 | 1.099 | 1.001 | 1.490 | 1.010 | 1.401 |
| f2/d3 | −7.453 | −7.427 | −11.800 | −11.980 | −4.012 | −4.018 |
| n1 | 2.001 | 2.001 | 2.001 | 2.001 | 1.713 | 2.001 |
| d7/d5 | 2.511 | 2.466 | 4.980 | 1.518 | 3.418 | 4.521 |

TABLE 7-continued

| Parameters and Relational Expressions | Embodiment 1 | Embodiment 2 | Embodiment 3 | Embodiment 4 | Embodiment 5 | Comparative Embodiment |
|---|---|---|---|---|---|---|
| R5/R6 | 2.272 | 1.810 | 1.520 | 4.980 | 1.025 | 4.875 |
| d3/d2 | 1.51 | 3.22 | 0.24 | 1.01 | 4.99 | 1.15 |
| f | 5.034 | 5.019 | 6.704 | 4.569 | 7.691 | 10.795 |
| f1 | 6.249 | 5.514 | 6.710 | 6.808 | 7.765 | 15.120 |
| f2 | −4.457 | −4.378 | −4.138 | −5.114 | −5.316 | −5.958 |
| f3 | 7.775 | 9.352 | 10.891 | 7.753 | 44.431 | 9.196 |
| f4 | 8.826 | 8.385 | 6.751 | 7.601 | 6.978 | 15.733 |
| FNO | 2.000 | 2.000 | 2.000 | 2.000 | 2.000 | 2.000 |
| TTL | 10.019 | 9.952 | 10.191 | 11.286 | 14.538 | 15.444 |

Those skilled in the art can understand that the above embodiments are specific embodiments for implementing the present disclosure, and in practical applications, various changes may be made in forms and detail without departing from the spirit and scope of the present disclosure.

What is claimed is:

1. A camera optical lens, comprising: from an object side to an image side, a first lens having positive refractive power with a convex object side surface in a paraxial region, a second lens having negative refractive power with a concave object side surface and a concave image side surface in a paraxial region, a third lens having positive refractive power with a concave object side surface and an convex image side surface in a paraxial region, and a fourth lens having positive refractive power with a convex object side surface in a paraxial region;

wherein a focal length of the optical camera lens is defined as f, a focal length of the first lens is defined as f1, a focal length of the second lens is defined as f2, an on-axis thickness of the first lens is defined as d1, an on-axis thickness of the second lens is defined as d3, an on-axis thickness of the third lens is d5, an on-axis thickness of the fourth lens is defined as d7, a total optical length from an object side surface of the first lens to an image plane of the camera optical lens along an optic axis of the camera optical lens is defined as TTL, and a refractive index of the first lens is defined as n1, and following relational expressions are satisfied:

$$1.50 \leq TTL/f \leq 2.50;$$

$$1.00 \leq f1/f \leq 1.50;$$

$$-12.00 \leq f2/d3 < -4.00;$$

$$n1 \geq 1.70;$$

$$1.50 \leq d7/d5 \leq 5.00;$$

$$0.095 \leq d1/TTL \leq 0.150; \text{ and}$$

$$0.272 \leq d7/TTL \leq 0.382.$$

2. The camera optical lens as described in claim 1, wherein a central curvature radius of an object side surface of the third lens is defined as R5, and a central curvature radius of an image side surface of the third lens is defined as R6, and a following relational expression is satisfied:

$$1.00 \leq R5/R6 \leq 5.00.$$

3. The camera optical lens as described in claim 1, wherein an on-axis distance from an image side surface of the first lens to an object side surface of the second lens is defined as d2, and a following relational expression is satisfied:

$$1.00 \leq d3/d2 \leq 5.00.$$

4. The camera optical lens as described in claim 1, wherein a central curvature radius of an object side surface of the first lens is defined as R1, a central curvature radius of an image side surface of the first lens is defined as R2, and following relational expressions are satisfied:

$$-3.68 \leq (R1+R2)/(R1-R2) \leq -0.62.$$

5. The camera optical lens as described in claim 1, wherein a central curvature radius of the object side surface of the second lens is defined as R3, a central curvature radius of the image side surface of the second lens is defined as R4, and following relational expressions are satisfied:

$$-2.24 \leq f2/f \leq -0.41;$$

$$0.01 \leq (R3+R4)/(R3-R4) \leq 0.66; \text{ and}$$

$$0.034 \leq d3/TTL \leq 0.092.$$

6. The camera optical lens as described in claim 1, wherein a focal length of the third lens is defined as f3, a central curvature radius of an object side surface of the third lens is defined as R5, a central curvature radius of an image side surface of the third lens is defined as R6, and following relational expressions are satisfied:

$$0.77 \leq f3/f \leq 8.67;$$

$$0.75 \leq (R5+R6)/(R5-R6) \leq 120.93; \text{ and}$$

$$0.054 \leq d5/TTL \leq 0.252.$$

7. The camera optical lens as described in claim 1, wherein a focal length of the fourth lens is defined as f4, a central curvature radius of an object side surface of the fourth lens is defined as R7, a central curvature radius of an image side surface of the fourth lens is defined as R8, and following relational expressions are satisfied:

$$0.45 \leq f4/f \leq 2.63;$$

$$-4.89 \leq (R7+R8)/(R7-R8) \leq -0.28;$$

8. The camera optical lens as described in claim 1, wherein the first lens, the second lens, the third lens and the fourth lens are made of glass, respectively.

9. The camera optical lens as described in claim 8, wherein an F-number FNO of the camera optical lens is smaller than or equal to 2.

10. The camera optical lens as described in claim 1, wherein an image height of the camera optical lens is defined as IH, and a following relational expression is satisfied:

$$TTL/IH \leq 6.93.$$

* * * * *